United States Patent
Berman et al.

(10) Patent No.: US 7,560,710 B2
(45) Date of Patent: Jul. 14, 2009

(54) METHOD AND APPARATUS FOR INCREASING ILLUMINATOR BRIGHTNESS IN A LIQUID CRYSTAL ON SILICON (LCOS) BASED VIDEO PROJECTION SYSTEM

(75) Inventors: Arthur Berman, San Jose, CA (US); Ying-Moh Liu, Saratoga, CA (US)

(73) Assignee: LightMaster Systems, Inc., Cupertino, CA (US)

( * ) Notice: Subject to any disclaimer, the term of this patent is extended or adjusted under 35 U.S.C. 154(b) by 577 days.

(21) Appl. No.: 11/281,702

(22) Filed: Nov. 17, 2005

(65) Prior Publication Data

US 2007/0120077 A1    May 31, 2007

(51) Int. Cl.
*F21V 9/16* (2006.01)
(52) U.S. Cl. .................... 250/461.1; 362/84
(58) Field of Classification Search ............. 250/461.1; 362/84
See application file for complete search history.

(56) References Cited

U.S. PATENT DOCUMENTS

| | | | | |
|---|---|---|---|---|
| 4,868,383 | A * | 9/1989 | Kurtz et al. ........... | 250/228 |
| 5,079,678 | A * | 1/1992 | Parker .................. | 362/84 |
| 7,327,408 | B1 * | 2/2008 | Berman ................ | 348/794 |
| 2004/0174696 | A1 * | 9/2004 | Buelow et al. .......... | 362/84 |
| 2006/0077673 | A1 * | 4/2006 | Berman et al. ......... | 362/458 |
| 2007/0019408 | A1 * | 1/2007 | McGuire et al. ....... | 362/231 |
| 2008/0224068 | A1 * | 9/2008 | Mii ...................... | 250/461.1 |

* cited by examiner

*Primary Examiner*—David P Porta
*Assistant Examiner*—David S Baker
(74) *Attorney, Agent, or Firm*—Martine Penilla & Gencarella, LLP

(57) ABSTRACT

Ultra Violet (UV) light produced by a light source is converted to visible light and utilized in a visible light output of the light source. The light source is, for example, a light source in an illuminator of a projection device. UV light that is typically filtered out of the illuminator is converted by a UV absorbing visible light radiating phosphor. The UV light is directed to the phosphor by, for example, reflecting the UV light out of a light path, concentrating the UV light via a concave reflector, and directing the UV light to the phosphor. The re-radiated visible light is then injected back into the light path of the light source. In one embodiment, the re-radiated visible light is injected into a "shadow" of the light path.

21 Claims, 4 Drawing Sheets

US 7,560,710 B2

METHOD AND APPARATUS FOR INCREASING ILLUMINATOR BRIGHTNESS IN A LIQUID CRYSTAL ON SILICON (LCOS) BASED VIDEO PROJECTION SYSTEM

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

BACKGROUND OF THE INVENTION

1. Field of Invention

The present invention relates to light sources. The present invention is more particularly related to light sources used in environments where UV light from the light source is undesirable. The invention is yet more particularly related to a light source in a Liquid Crystal on Silicon (LCoS) projection system such as that used in High Definition (HD) Rear Projection Television (RPTV) applications.

2. Discussion of Background

The projection mechanism within a LCoS microdisplay based video projector is called a light engine. The light engine generally includes a light source and a kernel for modulating light input from the light source. The modulated light is then projected for viewing. The light source may be of a variety of light source types, but is typically a mercury short arc lamp. Note that this type light source outputs a great deal of ultra violet light. Since exposure to UV light can degrade microdisplays, one function of the illuminator is to filter out the UV.

FIG. 1 illustrates a generic illuminator 100. The generic illuminator includes a light source 105 that includes a parabolic reflector. The light source and parabolic reflector output a light beam that is nominally collimated. One characteristic of this light source is that there is a "shadow" in the center of the illumination pattern due to obscuration by the bulb.

SUMMARY OF THE INVENTION

The present inventors have realized the need to increase brightness of light sources used in video projection and other systems. The present inventors have also realized the need to reduce a "shadow" effect that occurs through the use of certain light source types, particularly mercury short arc lamps. The present invention provides a device and method in various embodiments that increase the light output by a light engine and reduce the "shadow" in certain types of light sources.

In one embodiment, the present invention provides an illuminator, comprising, a light source, a UV converter that converts UV light to visible light, and a UV light diverter positioned to divert UV light from the light source and direct it toward the UV converter. The UV converter is positioned such that the converted visible light is directed into a lightpath of light not diverted by the UV light diverter. The UV converter is, for example, a UV absorptive visible light radiating phosphor. In one embodiment, a parabolic reflector positioned to concentrate the UV light and direct the concentrated UV light to the UV converter. In one embodiment, the UV converter comprises a visible light reflector and a UV absorptive visible light radiating phosphor. The UV converter is configured, for example, to inject light into a "shadow" of the lightpath.

In another embodiment, the present invention is an illuminator, comprising, a light source configured to emit a light beam in a light path of the illuminator, a visible light transmitting and UV light reflecting optical element disposed at an angle to the light path and configured to reflect UV light into a UV light path of the illuminator, a condensing UV reflector disposed in the UV light path and configured to concentrate reflected UV light, a UV converter comprising a UV absorptive visible light emitting phosphor and a set of optics configured to direct the visible light emitted from the phosphor into the light path of the illuminator. The UV converter is, for example, located in a central area of the visible light transmitting and UV light reflecting optical element. The central area is, for example, located in a "shadow" of the light beam in the light path of the illuminator. The illuminator is arranged, for example, such that the light path of the illuminator is utilized to illuminate Liquid Crystal on Silicon (LCoS) microdisplays in a LCoS based light engine of a High Definition (HD) Rear Projection Television (RPTV).

The present invention includes a method comprising the steps of reflecting UV light out of a light path, converting the reflected UV light to a visible light, and directing the converted visible light into the lightpath. The step of converting comprises, for example, directing the reflected UV light toward a phosphor having properties of absorbing UV light and re-radiating visible light. The phosphor properties are, for example, matched such that the re-radiated visible light supplements wavelengths of light that are deficient in the lightpath because of the source or because of how the lightpath is used. The step of directing the converted visible light is, for example, a step of directing the converted visible light into a "shadow" in the lightpath. The method is, for example, utilized to condition a lightpath in a Liquid Crystal on Silicon (LCoS) based High Definition (HD) Rear Projection Television (RPTV).

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DESCRIPTION OF THE PREFERRED EMBODIMENTS

The present invention provides a UV light converter configured to convert UV light into visible light and include the UV light converted to visible light in the output of a light source. The light source is, for example, a light source in a video projection system. In one embodiment, the UV converter comprises a phosphor that efficiently converts unused ultra violet light into useable visible light.

Figure 1:
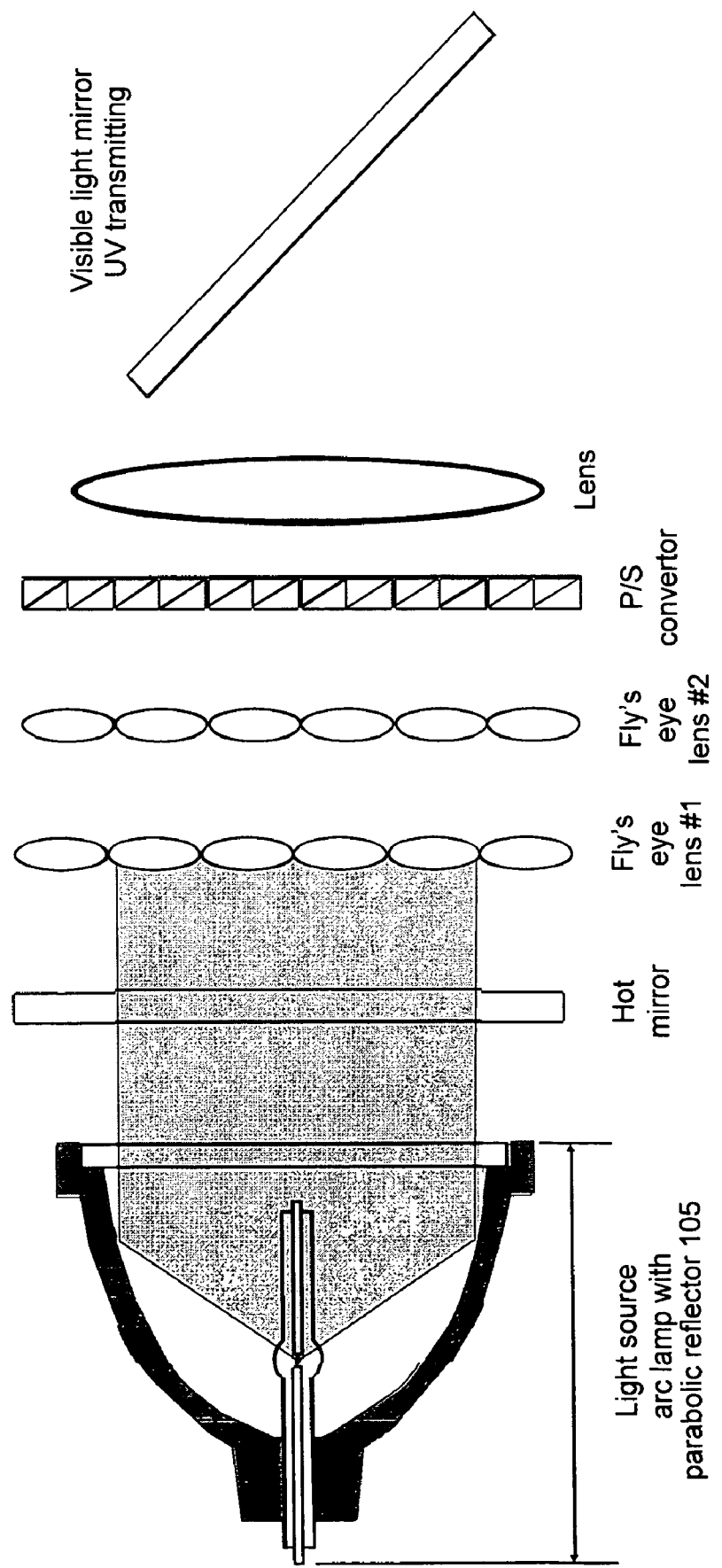
FIG. 1 is a drawing of a generic illuminator.
Figure 2:
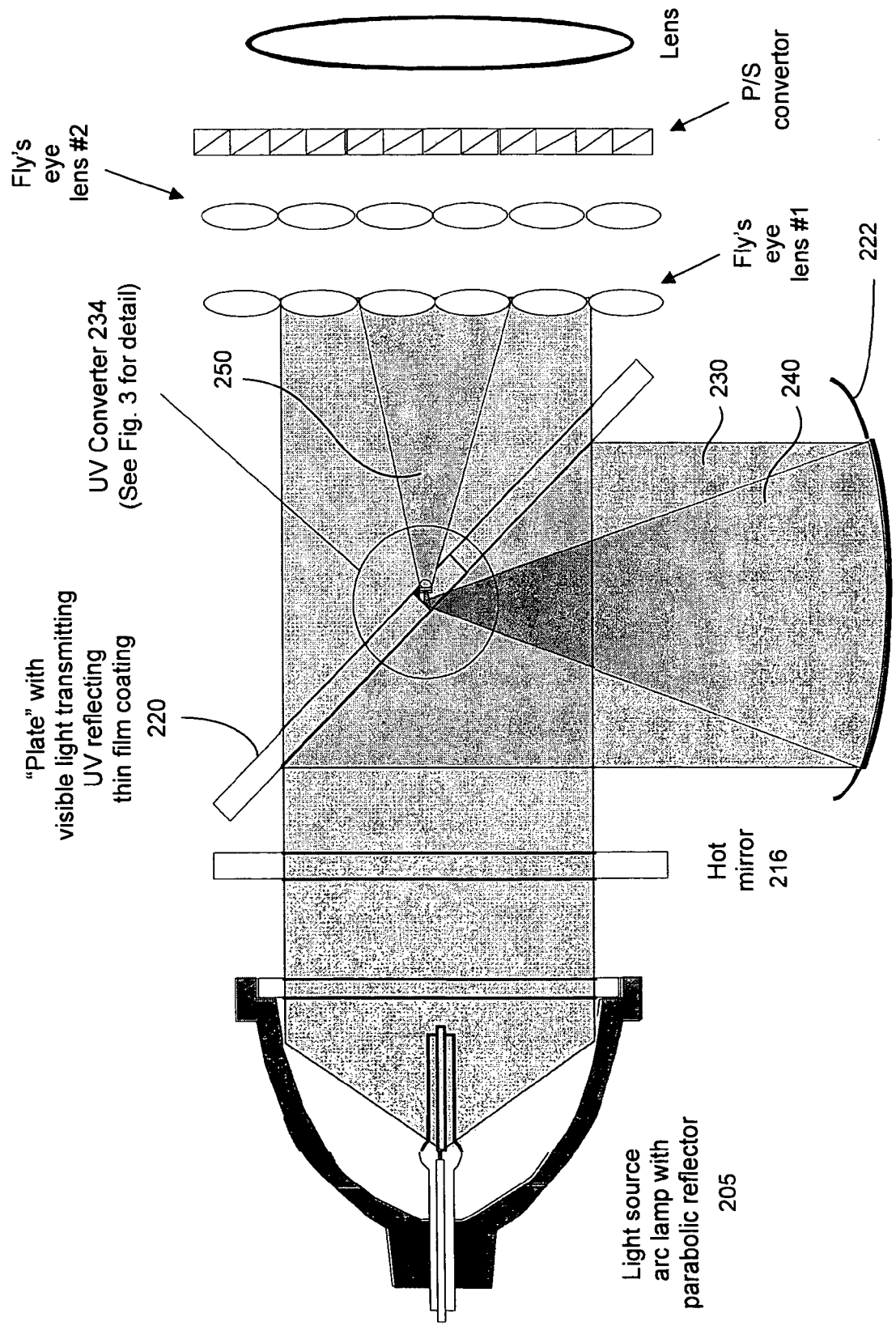
FIG. 2 is a configuration of an illuminator according to an embodiment of the present invention.

Referring again to the drawings, wherein like reference numerals designate identical or corresponding parts, and more particularly to FIG. 2 thereof, there is illustrated one of the many possible configurations of the invention. In this embodiment, the invention is integrated into an illuminator. Note that only those illuminator components needed for the following explanation of the invention have been included in the figure. Other components, such as filters and lenses may be required for a particular application, but, since they do not help with the explanation of the invention, they are not included in FIG. 2.

As shown in FIG. 2, an arc lamp light source coupled with a parabolic reflector 205 provides a collimated light beam along a light path in an illuminator. A "plate" 220 is disposed in the light path and intersects the light beam at an angle. Preferably, the plate is disposed at a 45 degree angle to the light beam. The plate 220 is a visible light transmitting/UV reflecting plate. The visible light transmitted by the plate 220 goes on to enter fly's eye integration and polarization conversion optics (Fly's eye #1, Fly's eye #2, and P/S converter, for example). As noted above, there is a "shadow" in the center of the illumination pattern.

UV Light in the light beam (UV light 230) is directed out of the light path toward a concentrating reflector (e.g., concave mirror 222). Concentrated UV light 240 is redirected to a UV converter 234 that converts the concentrated UV light into an output white light 250. The output white light 250, is, for example, injected into the light path in a "shadow" of the light beam.

In one embodiment, the concave mirror 222 reflects the UV light 230 and focuses it (concentrated UV light 240) onto the edge of a hole that is in the plate 220. An edge of the hole is coated with a UV reflecting thin film coating. Reflection from the mirror (UV reflecting thin film coating) redirects the central ray of the UV light so as to be parallel to the optical axis of the light engine (that is, parallel to the undiverted input visible light.) The plane of the mirror (UV reflecting thin film coating) is, for example, at an angle of 45 degrees to the central ray of the input UV light.

Figure 3:
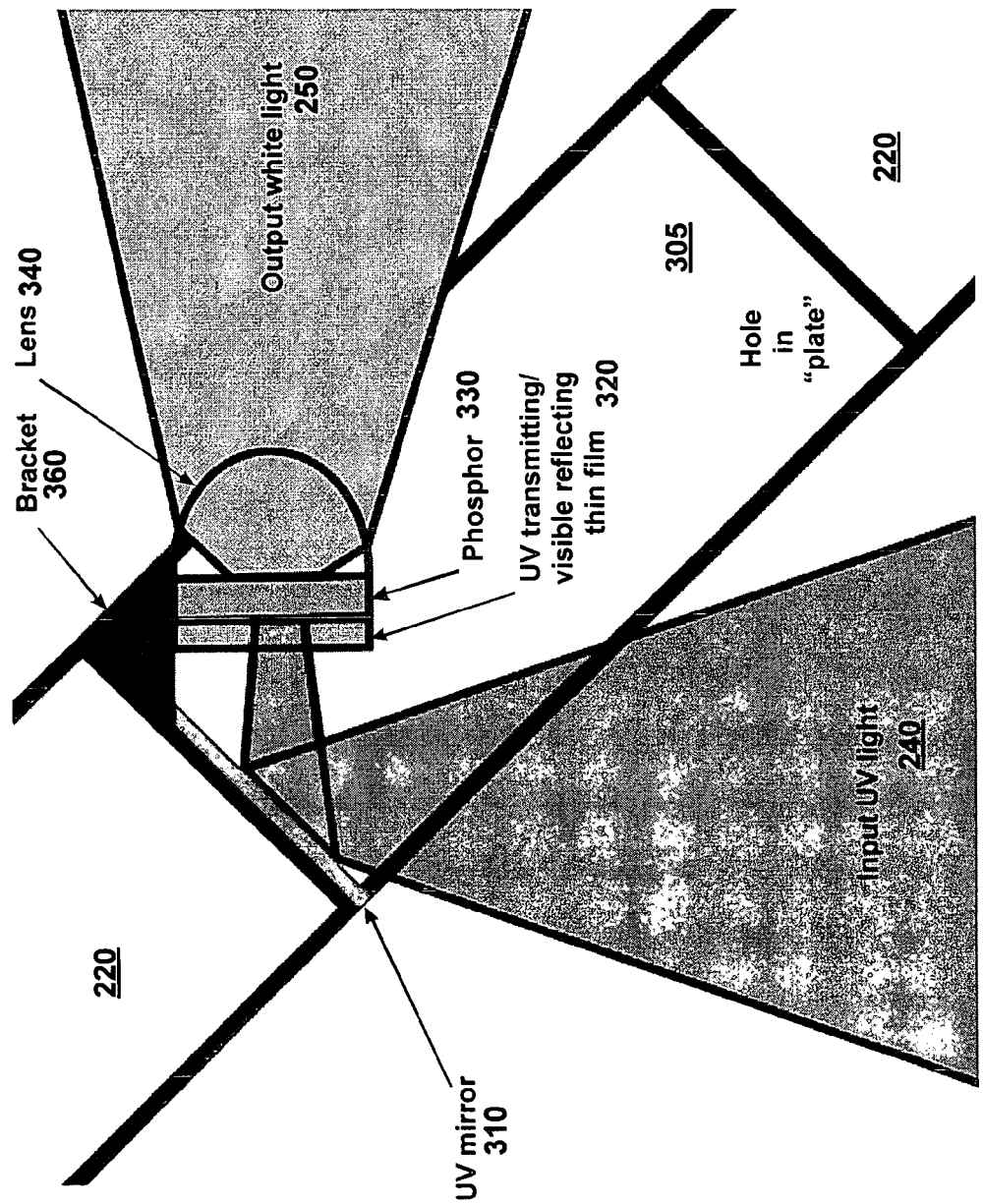
FIG. 3 is a close-up of the components of an example UV converter according to an embodiment of the present invention.

FIG. 3 is a close-up of the components of an example UV converter according to an embodiment of the present invention. The UV converter is, for example, a series of small optical components, mainly, a UV mirror 310, UV transmitting visible reflecting thin film 320, phosphor 330, and lens 340. These small optical components are held in position, for example, within the hole through the use of a small bracket 360 attached to the side of the hole.

Note that the focal length of the concave mirror 222 is chosen such that, at the point of impact, the UV illuminated area consists of a small roughly circular area. The point of impact is the UV transmitting visible reflecting thin film 320 which transmits UV light and reflects visible light. The transmitted UV then goes on to impact the phosphor 330 (e.g., a layer of phosphor). The phosphor is selected for its radiating properties. For example, the phosphor has the property that, when illuminated by UV light, it re-radiates white light (Note that phosphors are available with high conversion efficiency and that re-radiate any desired portion of the visible spectrum).

More particularly, the phosphor is chosen to re-radiate visible light in a spectrum most advantageous to an application in which the illuminator is being applied. In one embodiment, the phosphor properties are chosen to re-radiate light that closely matches the spectrum of light radiated by the light source (e.g., light source 205, or light source 405, for example). In another embodiment, the phosphor properties may be chosen to re-radiate visible light in a spectrum having emphasis in wavelengths where a system using the illuminator is deficient. Such deficiencies may be due to the spectrum of the illuminator or other engineering factors present in the design and/or materials of the optical system.

The white light emitted by the phosphor radiates in all directions. The portion that is directed "backwards" towards the thin film, is reflected by the thin film 320 into the "forward" direction. The emitted white light then enters a lens 340 that focuses it (output white light 250) in the central portion of fly's eye lens #1.

The present inventors recognize that only a portion ("useful portion") of this "converted" light will be within the proper angular range to contribute to the illumination of a system requiring collimated light. The useful portion not only serves to increase the overall illumination level but also "fills in" the central "shadowed" portion of the illumination pattern.

Another feature of the invention is that the distance between the light source and fly's eye lens #1 is longer in the disclosed configuration than in the conventional configuration. Since it is common for there to be some divergence in the beam produced by the light source it may be desirable to add a lens after the "plate" to better collimate the light beam. As a practical matter, the function of this lens can be incorporated into the "plate" component. This can be accomplished by forming the "plate" by molding and adding optical power to the back side of the plate (e.g., the optically downstream side of the plate is slightly convex in an amount that adjusts or further collimates the light beam).

Figure 4:
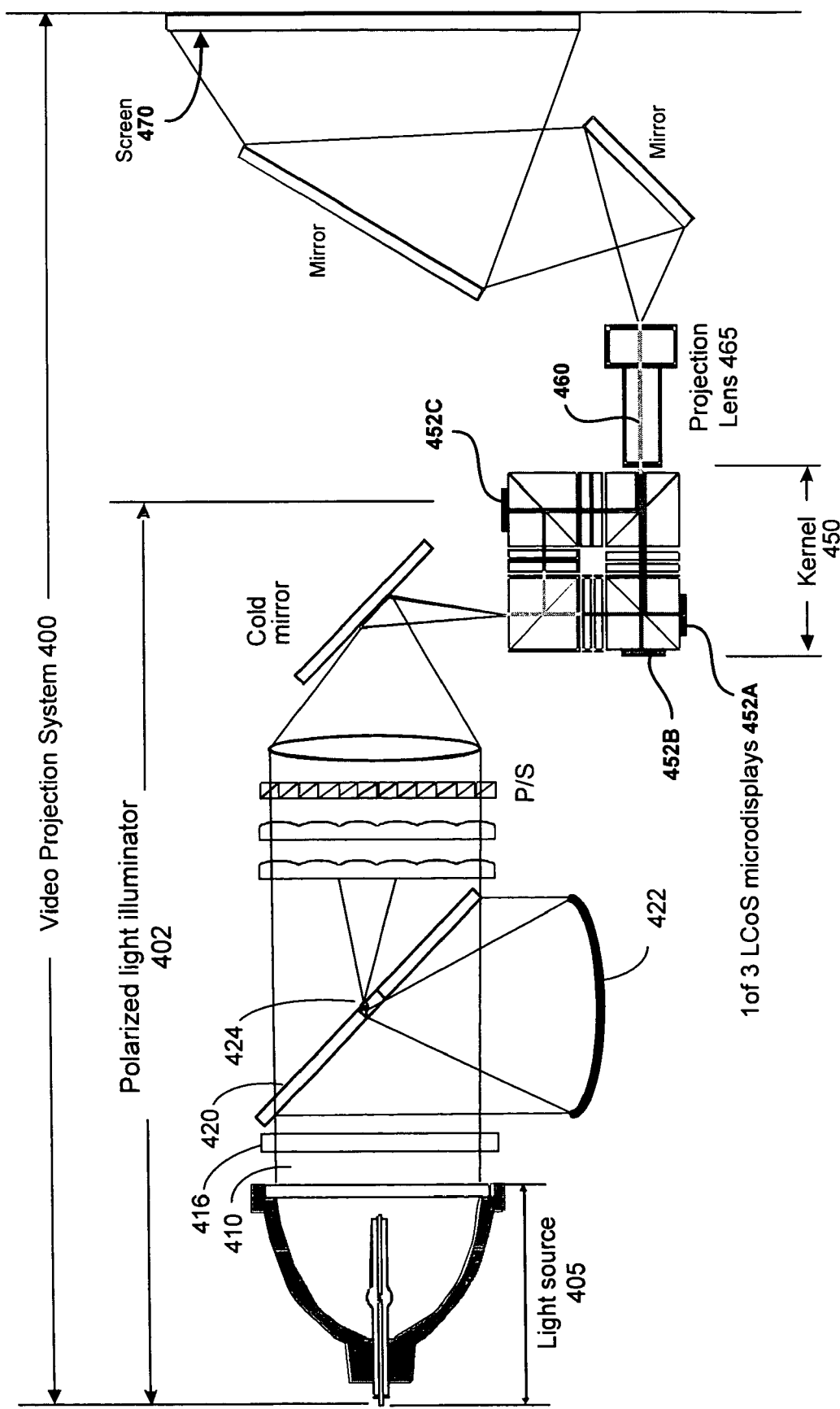
FIG. 4 is a drawing of a Liquid Crystal on Silicon (LCoS) based projection device according to an embodiment of the present invention.

FIG. 4 is a drawing of a Liquid Crystal on Silicon (LCoS) based projection system 400 (a video projector and projection display) according to an embodiment of the present invention. As shown in FIG. 4, white light 410 is generated by a light source 405. The light is collected, homogenized, polarized, and formed into the proper shape and otherwise processed by optics (not all shown for clarity).

The collection, homogenization, and polarization is performed, in part, by a visible light transmitting UV reflective plate 420 (e.g., plate having a visible light transmitting UV reflective thin film disposed on an impact surface of the plate), a concave reflecting surface 422, and UV to visible light converter 424. The components may be arranged, for example, as described above.

The collected, homogenized, and polarized light then enters a prism assembly where it is broken into component light beams (in this example, the component light beams are red, green and blue polarized light beams). A set of reflective microdisplays 452A, 452B, and 452C are provided and positioned to correspond to each of the polarized light beams (the prism assembly with the attached microdisplays is called a kernel 450). The component light beams then follow different paths within the prism assembly such that each beam is directed to a specific reflective microdisplay. The microdisplay that interacts with (reflects) the green beam modulates the green content of a full color video image. Similarly, the red and blue contents of the full color image are modulated by corresponding "red" and "blue" microdisplays. The prism assembly then recombines the modulated beams into a modulated white light beam 460 that contains the full color video image. The resultant modulated white light beam 460 then exits the prism assembly and enters a projection lens 465. Finally, the image-containing beam (white light beam 460 has been modulated and now contains the full color image) is projected onto a screen 470.

As shown in FIG. 4, the kernel is a quad style kernel/prism assembly that is constructed, for example, from a set of beam splitters. The example kernel in FIG. 4 uses a set of 4 polarizing beam splitters. Other beam splitter types and kernel configurations may be utilized (e.g., single panel microdisplays in combination with a color wheel, 4 channel kernels, 3D kernels, etc.). Depending on the design of the kernel, other optical components (e.g., mainly optical elements such as polarizers, waveplates, ColorSelects, filters, dichroics, optical blanks, etc.) may be disposed at various locations within the kernel. In the example kernel of FIG. 4, certain optical elements are disposed, for example, between adjacent faces of the beamsplitters.

The microdisplays 452A, 452B, and 452C, are, for example, reflective Liquid Crystal on Silicon (LCoS) microdisplays. The microdisplays have enough modulation resolution (pixels) to modulate a High Definition (HD) display. The video projection system 400 is, for example, an LCoS HD Rear Projection Television (RPTV).

In describing preferred embodiments of the present invention illustrated in the drawings, specific terminology is employed for the sake of clarity. However, the present invention is not intended to be limited to the specific terminology so selected, and it is to be understood that each specific element includes all technical equivalents which operate in a similar manner. For example, when describing phosphors, any other equivalent device UV converting device or material having an equivalent function or capability, whether or not listed herein, may be substituted therewith. Furthermore, the inventors recognize that newly developed technologies not now known may also be substituted for the described parts and still not depart from the scope of the present invention. All other described items, including, but not limited to thin film coatings, mirrors, shapes, placement of individual components, lenses, light sources, etc should also be considered in light of any and all available equivalents.

The present invention may suitably comprise, consist of, or consist essentially of, any of element (the various parts or features of the invention) and their equivalents as described herein. Further, the present invention illustratively disclosed herein may be practiced in the absence of any element, whether or not specifically disclosed herein. Obviously, numerous modifications and variations of the present invention are possible in light of the above teachings. It is therefore to be understood that within the scope of the appended claims, the invention may be practiced otherwise than as specifically described herein.

What is claimed and desired to be secured by Letters Patent of the United States is:

1. A method, comprising the steps of:
    reflecting UV light out of a light path;
    converting the reflected UV light to a visible light including directing the reflected UV light toward a phosphor having properties of absorbing UV light and re-radiating visible light wherein the phosphor properties are matched such that the re-radiated visible light supplements wavelengths of light that are deficient in the lightpath because of the source or because of how the light path is used; and
    directing the convened visible light into the light path.

2. The method according to claim 1, wherein the step of converting the reflected UV light further includes concentrating the UV light and directing the concentrated UV light toward the phosphor.

3. The method according to claim 1, wherein the light path comprises an illuminator light path in a Liquid Crystal on Silicon (LCoS) based High Definition (HD) Rear Projection Television (RPTV).

4. A method, comprising the steps of:
    reflecting UV light out of a light path;
    converting the reflected UV light to a visible light; and
    directing the converted visible light into the light path including directing the converted visible light into a "shadow" in the light path.

5. An illuminator, comprising:
    a light source;
    a UV converter that converts UV light to visible light wherein the converter includes a mirror, a phosphor and a lens;
    a UV light diverter positioned to divert UV light from the light source and direct it toward the UV converter;
    wherein the UV converter is positioned such that the converted visible light is directed into a light path of light not diverted by the UV light diverter, wherein the mirror and lens are configured to inject light into the light path and wherein the mirror and lens are positioned to inject light into a "shadow" of the light path.

6. An illuminator, comprising:
    a light source configured to emit a light beam in a light path of the illuminator;
    a visible light transmitting and UV light reflecting optical element disposed at an angle to the light path and configured to reflect UV light into a UV light path of the illuminator;
    a condensing UV reflector disposed in the UV light path and configured to concentrate reflected UV light; and
    a UV converter including a UV absorptive visible light emitting phosphor and a set of optics configured to direct the visible light emitted from the phosphor into the light path of the illuminator wherein the UV converter is located in a central area of the visible light transmitting and UV light reflecting optical element.

7. The illuminator according to claim 6, wherein: the series of optics comprises, a visible light reflective mirror configured to reflect visible light emitted from the phosphor, and a lens configured to direct visible light emitted from the phosphor into the light path of the illuminator.

8. The illuminator according to claim 7, wherein the visible light reflective mirror reflects visible light and transmits UV light.

9. The illuminator according to claim 6, wherein the light path of the illuminator is utilized to illuminate Liquid Crystal on Silicon (LCoS) microdisplays.

10. The illuminator according to claim 9, wherein the LCoS microdisplays are configured to modulate light in a projection device.

11. The illuminator according to claim 6, wherein the light path of the illuminator is utilized to provide light to a Liquid Crystal on Silicon (LCoS) based light engine in a High Definition (HD) Rear Projection Television (RPTV).

12. The illuminator according to claim 6, wherein the visible light transmitting and UV light reflecting optical element includes a UV reflective plate.

13. The illuminator according to claim 6, wherein condensing UV reflector includes a parabolic reflector positioned to direct the concentrated UV light to the UV converter.

14. The illuminator according to claim 6, wherein the set of optics includes a mirror and a lens.

15. The illuminator according to claim 14, wherein the mirror and lens are configured to inject light into the light path.

16. The illuminator according to claim 15, wherein the mirror and lens are positioned to inject light into a "shadow" of the light path.

17. An illuminator, comprising:
    a light source configured to emit a light beam in a light path of the illuminator;
    a visible light transmitting and UV light reflecting optical element disposed at an angle to the light path and configured to reflect UV light into a UV light path of the illuminator;

a condensing UV reflector disposed in the UV light path and configured to concentrate reflected UV light; and a UV converter comprising a UV absorptive visible light emitting phosphor and a set of optics configured to direct the visible light emitted from the phosphor into the light path of the illuminator, wherein the visible light transmitting and UV light reflecting optical element comprises a plate having a through port comprising a mirror.

18. The illuminator according to claim 17, wherein the central through port is located in a "shadow" of the light beam in the light path of the illuminator.

19. The illuminator according to claim 17, further comprising a reflecting surface disposed in the through port.

20. The illuminator according to claim 19, wherein the reflecting surface is a UV reflective surface configured to direct the concentrated UV light into the UV converter.

21. The illuminator according to claim 19, wherein the reflecting surface comprises a visible light mirror configured to direct UV converted visible light into the light path of the illuminator.

* * * * *